United States Patent [19]
Ben-Michael et al.

[11] Patent Number: 5,339,313
[45] Date of Patent: Aug. 16, 1994

[54] METHOD AND APPARATUS FOR TRAFFIC CONGESTION CONTROL IN A COMMUNICATION NETWORK BRIDGE DEVICE

[75] Inventors: Siman-Tov Ben-Michael; Philip P. Lozowick, both of Jerusalem, Israel; William Hawe, Pepperell; Butler Lampson, Cambridge, both of Mass.

[73] Assignee: Digital Equipment Corporation, Maynard, Mass.

[21] Appl. No.: 722,747

[22] Filed: Jun. 28, 1991

[51] Int. Cl.$^5$ ............................................. H04L 12/46
[52] U.S. Cl. ................................ 370/85.13; 370/85.2; 370/85.3
[58] Field of Search ..................... 370/85.3, 85.2, 85.13

[56] References Cited

U.S. PATENT DOCUMENTS

| | | | |
|---|---|---|---|
| 4,063,220 | 12/1977 | Metcalfe et al. | 340/147 LP |
| 4,234,952 | 11/1980 | Gable et al. | 370/94 |
| 4,292,623 | 9/1981 | Eswaran et al. | 340/147 R |
| 4,500,990 | 2/1985 | Akashi | 370/85.3 |
| 4,706,081 | 11/1987 | Hart et al. | 340/825.03 |
| 4,727,537 | 2/1988 | Nichols | 370/85.2 |
| 4,809,265 | 2/1989 | Hart et al. | 370/85 |
| 4,811,337 | 3/1989 | Hart | 370/85 |
| 4,876,742 | 10/1989 | Vacon et al. | 455/66 |
| 4,959,829 | 9/1990 | Griesing | 370/85.3 |
| 5,058,109 | 10/1991 | Goldberg et al. | 370/94.1 X |

OTHER PUBLICATIONS

European Search Report dated Oct. 13, 1992, Application No. EP 92 30 5675.
IEEE Network, vol. 2, No. 1, Jan. 1988, New York, N.Y., USA, pp. 72–76. M. Gerla, et al., "Congestion Control in Interconnected LANs".
Computer Design, vol. 28, No. 3, Feb. 1, 1989, pp. 117–120. G. Rauh, "Local buffers minimize LAN data—rate demands".
IEEE INFOCOM '89, vol. 1, Apr. 1989, Ottawa, Canada, pp. 28–37. L. Merakos, et al., "Interconnection of CSMA/CD LANS Via An N-Port Bridge".

*Primary Examiner*—Douglas W. Olms
*Assistant Examiner*—Russell W. Blum
*Attorney, Agent, or Firm*—Barry N. Young; A. Sidney Johnston

[57] ABSTRACT

A technique for controlling access to a bridge connected to at least two networks, such that buffer memory requirements are minimized. For at least one target network of the two networks, two dynamic lists are maintained, to keep track of data packets received from the target network and not yet forwarded, and to keep track of data packets stored for forwarding to the target network, but not yet forwarded. The target network uses a half-duplex medium and a CSMA/CD (Carrier Sense Multiple Access with Collision Detection) protocol. The invention operates by adjusting network protocol parameters used in the target network, to either guarantee or deny priority to the target network in the event of a collision, based on the continually observed status of the two lists. One of the adjustments modifies a backoff value that determines the amount of time that the bridge device will wait, in the event of a collision, before attempting to retransmit a data packet. Another adjustment used is to apply backpressure to the target network, in the form of a carrier signal, to deny its use by other devices when buffer storage in the bridge is already full and there are no data packets ready to send to the target network.

16 Claims, 5 Drawing Sheets

METHOD AND APPARATUS FOR TRAFFIC CONGESTION CONTROL IN A COMMUNICATION NETWORK BRIDGE DEVICE

BACKGROUND OF THE INVENTION

This invention relates generally to communication networks and, more particularly, to devices known as bridges, connected to two or more networks and providing a convenient mechanism for transferring data packets between one network and another. Even more particularly, the invention applies to networks that employ a protocol commonly referred to as Carrier Sense Multiple Access with Collision Detection (CSMA/CD). One such network is known as Ethernet.

Under the CSMA/CD rules for access to a network bus or cable, any station wishing to transmit must first "listen" to make sure that the cable is clear before beginning to transmit. All stations on the network have equal priority of access and may begin transmitting as soon as the line is clear and any required inter-packet delay has elapsed. However, if a first station that has started transmitting detects a "collision" with a transmission from another station, the first station continues transmitting for a short time to make sure that all stations wishing to transmit will detect the collision. Every other station detecting the collision also continues to transmit for a short time. Then each station that has detected a collision terminates transmission for some random period of time. The stations involved in the collision select random, and therefore usually different, delay times before trying transmission again.

Partly because of the half-duplex operation of the networks to which the bridge is connected, the bridge has to provide buffer memory for temporarily storing data packets that it is unable to forward immediately onto the destination network. The size of the buffer memory depends on the amount of traffic that the bridge is called upon to handle, the congestion of the destination network, and the accepted level of packet loss. One possible solution to this difficulty is simply to provide a very large amount of buffer memory, so that there is practically always sufficient memory to store a data packet received from one network and destined for another network that is temporarily busy. However, a bridge with a very large buffer memory is costly to implement. For a bridge of lower cost, and smaller buffer memory, some form of congestion control is required, to limit the flow of data packets into the bridge. One way of doing this is, when receiving a data packet through one port of the bridge, to simply "jam" or inhibit data flow from the other port or ports of the bridge. Although this and similar techniques provide for a low-cost bridge implementation, they do not make the most efficient use of the bridge. Clearly, there is much room for improvement in providing traffic congestion control for bridges, and the present invention is directed to this end.

Another aspect of the background to this invention is the manner in which the CSMA/CD protocols select delay times, known as backoff values, when a collision is encountered. The backoff value is expressed as a number of time slots, where one time slot is the network roundtrip delay for the maximum network configuration. After a collision, the normal CSMA/CD protocol calls for the use of randomly selected backoff value between 0 and 1. If there is a second collision, the backoff value is selected from 0 through 3; and after a third collision the backoff value may be between 0 and 7. After subsequent collisions on attempts to retransmit, the backoff value is selected from increasingly greater ranges of numbers, up to 0 to 1,023. Following sixteen attempts to transmit the same packet, it will be discarded, and a new packet will be transmitted, beginning with a backoff value of 0 or 1 following a first collision.

One goal of the present invention is to provide a congestion control mechanism in which the size of the buffer memory is greatly reduced while the packet loss due to the temporary inability of a bridge to accept data remains at an acceptable level. Packet loss is not a totally accurate term, since any "lost" packets will usually be retransmitted upon detection of the loss in some higher level of network protocol.

Another goal of the present invention is to provide a congestion control mechanism that will have little or no effect on the performance of a bridge in which it is installed. In particular, the throughput of the bridge should not be significantly affected by the presence of the congestion control technique, and the latency or transmission delay time should not be significantly increased. The present invention achieves these and other goals.

SUMMARY OF THE INVENTION

The present invention resides in a method, and related apparatus, for controlling the flow of data packets from one network to another through a bridge connected to both networks. For purposes of explanation, the two networks are referred to as the communication network and the client interface, and the invention is described as regulating the flow of data packets to and from only one of the networks, the client interface. However, it will be understood as the description proceeds that the invention could be applied to the other network, or to both networks, to further minimize buffer memory requirements. The client interface may have one client device or multiple client devices connected to it, which may be the source or destination of message packets handled by the mechanism of the invention.

Briefly, and in general terms, the method of the invention comprises the steps of receiving inbound data packets from a communication network; storing each inbound data packet, if necessary, until the client interface becomes available; transmitting the packet onto the client interface; receiving outbound data packets from the client interface; storing each outbound data packet, if necessary, until the communication network becomes available; transmitting the outbound data packet onto the communication network; and controlling the steps of transmitting to and receiving from the client interface, to minimize buffering requirements.

The invention makes use of the protocol known as Carrier Sense Multiple Access with Collision Detection (CSMA/CD), which provides that, when there is a "collision" between data packets transmitted onto a network by two or more different devices, the conflict is resolved by requiring each device to wait for some randomly selected time before attempting retransmission. When the invention detects that there is at least one data packet that has been received from the client interface but has not yet been processed (i.e. sent to the network), it selects a backoff value of zero in the event of a collision. This gives retransmission priority to the bridge device of the invention, since a zero backoff value means that the bridge may keep trying repeatedly without delay for access to the client interface, but a client connected to the interface will select a random backoff value. When the invention detects that there are no data packets from the client interface waiting to be further processed, it adjusts the backoff value to give priority to a client attempting to transmit to the interface. Specifically, the backoff value in this case is set to 2. Since the CSMA/CD rules call for selection of a backoff value of 0 or 1 after a first collision, the client will be guaranteed access upon the first retransmission after a collision.

Another aspect of the invention involves applying "backpressure" to the client interface at an appropriate time, to prevent clients from transmitting data packets onto the interface. The appropriate time for this action is when there is no more buffer memory capacity available to receive a packet from the client interface, and there are no packets waiting to be transmitted onto the client interface.

More specifically, the step of controlling transmitting to and receiving from the client interface includes maintaining a list of packets received from the client interface and not yet forwarded; maintaining a list of inbound packets received from the communication network and not yet forwarded to the client interface; and, based on the status of the two lists of packets, making appropriate adjustments to the client interface communication protocols to control the flow of data packets through the client interface.

The step of making appropriate adjustments to the client network communication protocols includes, detecting when the list of packets received from the client interface is empty and adjusting client interface protocol parameters to favor yielding client interface access to a client device in the event of a conflict for access to the client interface, thereby guaranteeing successful retransmission of more packets from a client onto the client interface. The method further includes detecting when the list of packets received from the client interface is not empty and adjusting client interface protocol parameters to favor retaining bridge access to the client interface in the event of a conflict for access, thereby giving priority to bridge retransmission following a collision with the client. When the list of packets received from the client interface is empty, the adjustments favor further transmission from any of multiple clients that may be connected to the client interface. When the list of packets received from the client interface is not empty, the adjustments favor retention of access to the client interface by the device of the invention. These adjustments are made by selecting an appropriate backoff value in the event of a collision when using the client interface. Selection of a larger backoff value for the bridge device after a collision gives priority to a client seeking access to the client interface. Selection of a zero backoff value effectively inhibits access to the client interface by a client.

The step of making appropriate adjustments to the client network further includes detecting when the list of packets received from the client interface is full and the list of inbound packets is empty, and placing the client interface in a busy condition so that no client can transmit further data packets onto the client interface. The busy condition is achieved by applying a carrier signal to the client interface, until such time as the need for the condition no longer exists. If the list of inbound packets is not empty, there are packets to transmit onto the client interface, and transmitting them will prevent further packets from being received, without the need for the artificial busy condition. If the list of packets received from the client interface is not full, there is room for at least one more packet, and therefore no need to artificially inhibit transmission onto the interface.

In the illustrative embodiment of the invention, the packets received from the client interface may be outbound packets, destined to be transmitted onto the communication network, or loopback packets for return to the client interface after processing. Therefore, the method may also include the steps of receiving a loopback packet from the client interface, and storing the loopback packet, if necessary, for later transmission back to the client interface.

The apparatus of the present invention comprises means for receiving inbound data packets from a communication network; an inbound buffer memory, for storing each inbound data packet until the client interface is available; means for transmitting the inbound data packet onto the client interface; means for receiving outbound data packets from the client interface; an outbound buffer memory, for storing each outbound data packet until the communication network is available; means for transmitting a data packet from the outbound buffer memory onto the communication network; and means for controlling the means for transmitting to and receiving from the client interface, to minimize buffering requirements. Other variants of the claimed apparatus are possible, consistent with the scope of the method described above.

It will be apparent from the foregoing that the present invention represents a significant advance in the field of bridge devices for use with half-duplex CSMA/CD networks. In particular, the invention provides a bridge device with minimal buffer memory requirements, by controlling access to at least one of the networks to which the bridge device is connected. The invention provides congestion control at a relatively low cost, by limiting buffer memory requirements while still maintaining an acceptable level of packet loss. Moreover, use of the invention does not result in degradation of performance. In fact, the performance of a bridge in which the mechanism is installed is slightly improved from a client standpoint, as compared with a configuration in which multiple client devices are connected directly to the communication network. When the outbound buffer is not empty, i.e. it contains one or more data packets, the communication network is busy and if multiple clients were connected directly with the network they would be unable to communicate with each other. However, when the outbound buffer contains just one packet awaiting transmission, multiple clients can still communicate with each other, although they would not have been able to do so if connected directly to the communication network.

It will also be appreciated that, although an embodiment of the invention has been described in detail for purposes of illustration, various modifications may be made without departing from the spirit and scope of the invention. For example, although the invention has been described as controlling access to one of two networks to which a bridge device is connected, it will be apparent that the same principles could be applied to the other network, or to both networks. More generally, the congestion control mechanism of the invention may be implemented in selected networks of a multiple-network communication system. Further, although the invention is well suited for application to networks in which loopback processing is a requirement, the principles of the invention are equally well suited to networks in which there is no requirement for loopback processing.

DESCRIPTION OF THE PREFERRED EMBODIMENT

Figure 1:
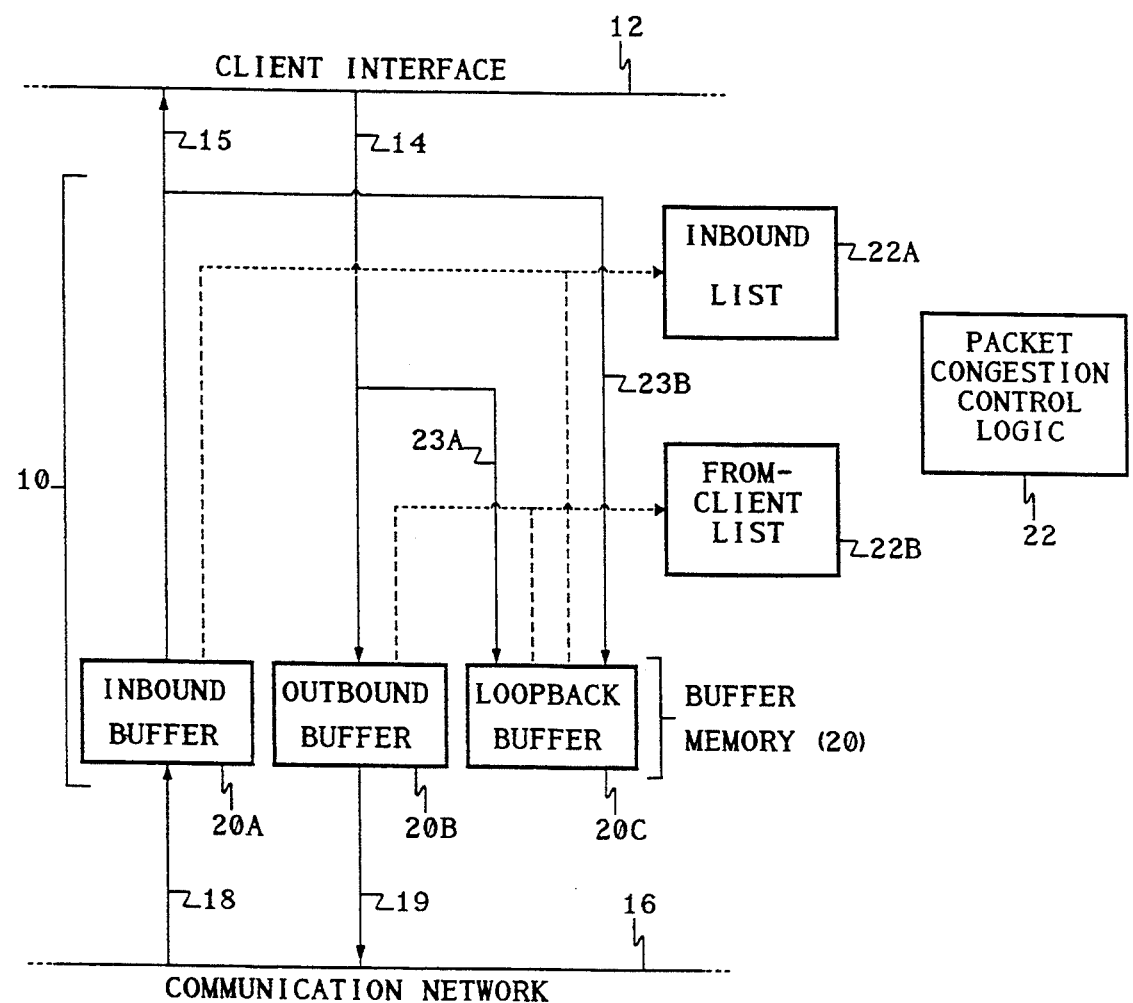
FIG. 1 is a simplified block diagram showing a bridge connected between a communication network and a client interface in accordance with the invention.

As shown in the drawings for purposes of illustration, the present invention is concerned with a technique for minimizing buffer memory requirements in a bridge device connected to at least two networks. FIG. 1 shows the basic environment in which the invention is used. A bridge, indicated by reference numeral 10, is connected to a network referred to as a client interface 12, from which the bridge receives data packets over line 14 and to which the bridge transmits data packets over line 15. The bridge 10 is also connected to a communication network 16, from which the bridge receives data packets over line 18 and to which the bridge transmits packets over line 19. Of course, the bridge 10 may also be connected to other networks, but for purposes of explanation only two networks are considered in this description.

When the bridge 10 receives a data packet from the communication network destined for the client interface, that latter may not always be available to accept the packet. Thus the bridge 10 needs to have a buffer memory 20 for the temporary storage of data packets being forwarded by the bridge. In general, there is little that the bridge can do to regulate the flow of traffic from the communication network 16. If packet loss is to be kept to a reasonably low level, a relatively large buffer memory is needed to store these "inbound" packets received from the communication network. To avoid having to use a very large buffer memory for packets received from the client interface, and to minimize packet loss, the bridge 10 also includes packet congestion control logic 22, which regulates the flow of data by modifying protocol parameters used in controlling access to the client interface 12.

In accordance with the invention, the packet congestion control logic 22 uses the status of inbound and outbound buffers 20A and 20B to determine how to regulate the flow of data packets to and from the client interface 12. In the embodiment of the invention to be described in detail, the congestion control technique is applied to only one side of the bridge 10, but it will be apparent that the technique may, in an appropriate application, be applied symmetrically to both sides of the bridge. The implementation to be described by way of example is embodied in a bridge device that also provides "loopback" processing for one or more "clients" using the client interface 12. In loopback processing, a data packet received from the client interface 12 is processed in some way by the bridge 10 and returned to the client interface. For this purpose, the buffer memory 20 also includes a loopback buffer 20C, which receives data from the client interface 12 over line 23A and transmits data to the client interface over line 23B.

The packet congestion control logic 22 makes use of two lists that reflect the status of the inbound, outbound and loopback buffers 20A, 20B, 20C. An inbound list 22A contains an entry for each data packet stored in the inbound buffer 20A, and a from-client list 22B contains an entry for each data packet stored in the outbound and loopback buffers 20B and 20C.

Figure 2:
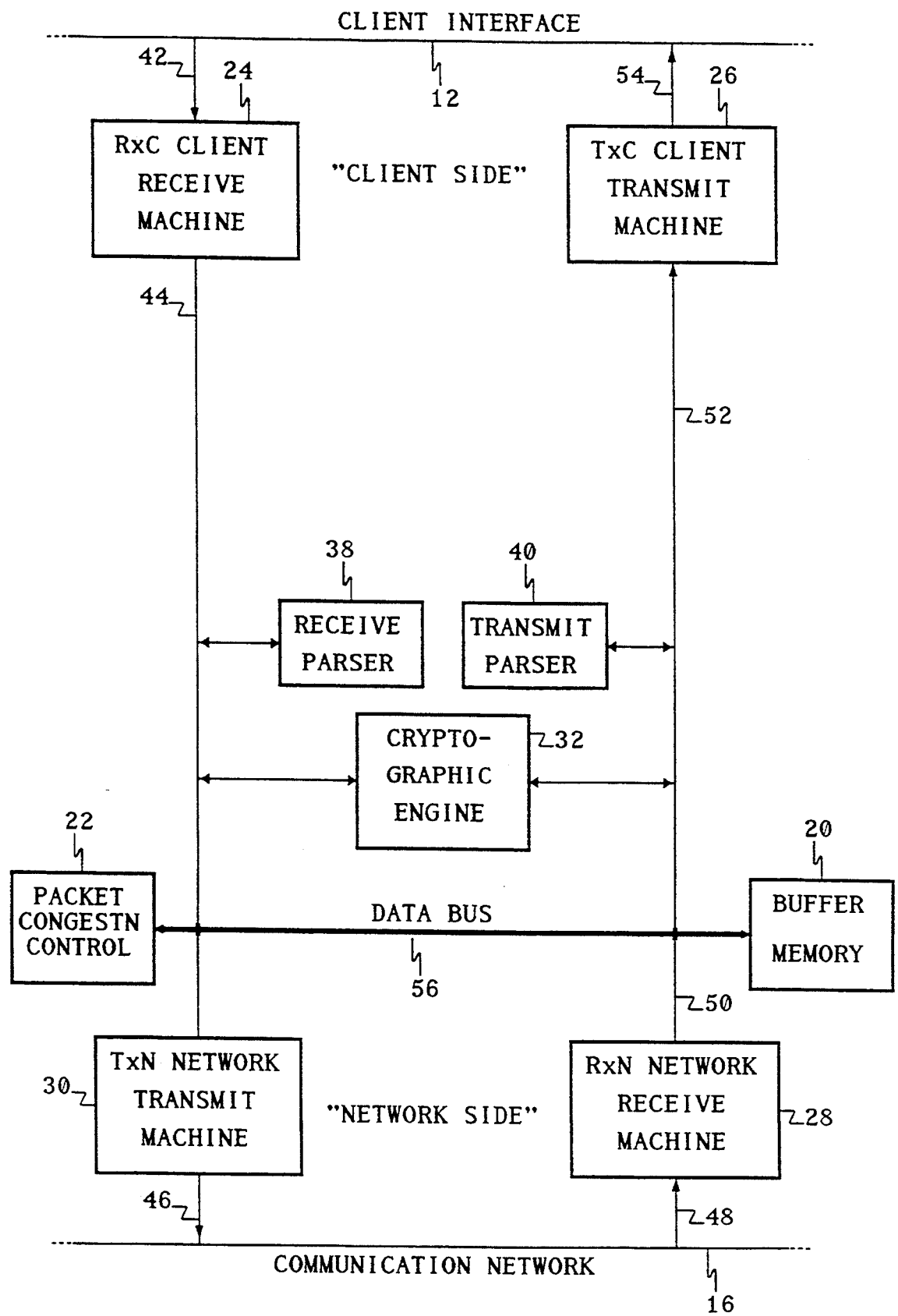
FIG. 2 is a block diagram showing how the packet congestion control technique of the invention is implemented in a cryptographic device connected between a communication network and a client interface.

FIG. 2 shows a bridge device connected between the client interface 12 and the communication network 16. In this specification, aspects of the device relating to the client interface are sometimes referred to as being on the "client side" of the device, and aspects relating to the communication network are sometimes referred to as being on the "network side." The relevant components of the device include a client receive machine 24, designated RxC, a client transmit machine 26, designated TxC, a network receive machine RxN 28, a network transmit machine TxN 30, a cryptographic engine 32, the buffer memory 20, a receive parser 38 and a transmit parser 40. The cryptographic engine 32, and the receive and transmit parsers 38 and 40 are, of course, needed only if the device of the invention is used in conjunction with cryptographic processing.

These components are connected in various logical configurations depending on the type of traffic being handled at a particular time. Although all of the data paths to be described pass through the buffer memory 20, there are two direct logical paths that make use of the buffer memory as part of each data path, and not for data packet storage. First, there is a direct logical path from the client interface 12 to the communication network 16. This path includes a line 42 from the client interface 12 to the client receive machine 24, a line 44 from the client receive machine to the network transmit machine 30 (by way of the buffer memory 20), and a third line 46 from the network transmit machine to the communication network 16. Similarly, there is another direct logical path from the communication network 16 to the client interface 12, including a line 48 from the communication network to the network receive machine 28, a line 50 from the network receive machine to the client transmit machine 26 (by way of the buffer memory 20), and a further line 54 from the client transmit machine to the client interface 12. The buffer memory 20 is connected by a data bus 56 to the "outbound" data path along line 44, and to the "inbound" data path along line 50. As already described with reference to FIG. 1, the buffer memory has three logically separate memories: the inbound buffer 20A, the outbound buffer 20B, and the loopback buffer 20C.

It will be understood from the foregoing description of data paths that the buffer memory 20 serves both to store data packets when they can not be immediately transmitted, and to pass data immediately, without storing the entire packet. While both these actions might technically involve "storing" data in the memory, in this specification the word "storing" is reserved for the situation in which an entire data packet is held for later forwarding onto the communication network 16 or the client interface 12. When a data packet passes through the buffer memory 20 in a "cut-through" mode of operation, a packet is already being transmitted from the memory while portions of it are still arriving at the memory.

The cryptographic interface provides for encryption or decryption of data packets passing in either direction between the client interface 12 and the communication network 16. The cryptographic aspects of this configuration have no direct bearing on the present invention, which may be implemented in any bridge or bridge-like device connected to two or more networks.

The client interface 12 includes a half-duplex medium, such as Ethernet, employing a protocol commonly referred to as Carrier Sense Multiple Access with Collision Detection (CSMA/CD). Under the CSMA/CD rules for access to a network bus or cable, any station wishing to transmit must first "listen" to make sure that the cable is clear before beginning to transmit. All stations on the network have equal priority of access and may begin transmitting as soon as the line is clear and any required inter-packet delay has elapsed. However, if a first station that has started transmitting detects a "collision" with a transmission from another station, the first station continues transmitting for a short time to make sure that all stations wishing to transmit will detect the collision. Every other station detecting the collision also continues to transmit for a short time. Then each station detecting the collision terminates transmission for some random period of time. The stations involved in the collision select random, and therefore usually different, delay times before trying transmission again.

The nature of the CSMA/CD rules for network access are such that full-duplex transmission, i.e. transmitting and receiving at the same time, is not possible. If a station is receiving a packet, the network is busy and a transmission cannot be started, from this or any other station. Similarly, if a transmission is in progress from this station, no packet can be received at the same time, since no other sending station can gain access to the network while this station is sending a message. Therefore, the nature of operation of an Ethernet or other CSMA/CD station is half-duplex, i.e. messages can be both transmitted and received, but because of the nature of the network access rules, not at the same time. As will be described, the present invention modifies the usual Ethernet CSMA/CD protocols in such a manner that the buffer memory size can be minimized, to reduce the cost of the bridge.

The present invention provides for three logical buffers within the physical buffer memory 20, although it will be understood that three completely separate physical buffers could have been used. The loopback buffer is needed for cryptographic or other processing performed by the bridge in the illustrative embodiment. In applications of the invention in which loopback processing for cryptographic or other purposes is not required, only the inbound buffer and the outbound buffer are needed. The inbound buffer is used to store data packets received from the communication network 16 and destined for the client interface 12. The outbound buffer is used to store data packets received from the client interface 12 and destined for the communication network 16. The loopback buffer is used to store data packets that are received from the client interface 12, cryptographically or otherwise processed, and then returned to the client interface.

The packet congestion control logic 22 uses two queues or lists to keep track of data packets that are stored in the three buffers. The lists are referred to as the from-client list 22A and the inbound list 22B. The from-client list contains an entry for each data packet received from the client interface 12 and not yet forwarded to its destination. These include both outbound packets destined for the communication network 16 and loopback packets destined to be returned to the client interface 12 after any required processing. In the illustrative embodiment of the invention, the from-client list contains a maximum of only two entries, to minimize buffer memory requirements in the device. Only one of the two entries in the from-client list may be for a data packet stored in the loopback buffer memory. Use of a small buffer in the device for packets received from the client interface 12 forces the client or clients to buffer outgoing data packets. The inbound list contains an entry for each data packet received from the communication network 16 and not yet forwarded to the client interface 12. Because the flow of traffic from the communication network 10 is largely beyond the control of the bridge device of the invention, the inbound list has a large maximum number of entries. In the illustrative embodiment of the invention, 1,023 entries are permitted, only one of which may be for a data packet stored in the loopback buffer memory, and the remainder being for data packets stored in the inbound buffer memory. Both lists operate as first-in-first-out queues, and are handled during data input and output operations as shown in FIGS. 3A and 3B.

Figure 3A:
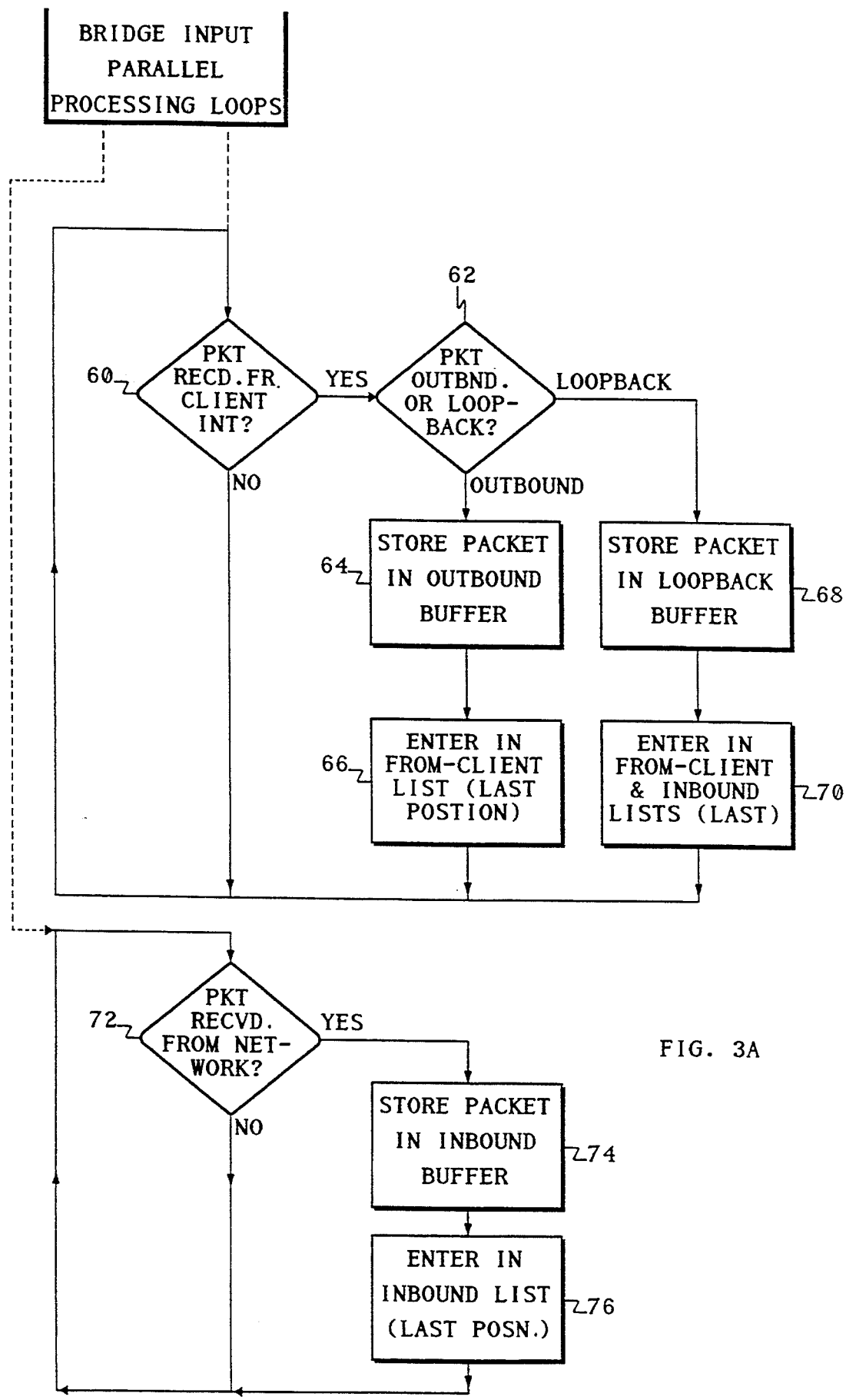
FIG. 3A is a flowchart showing the functional steps performed in processing packets that are input to the bridge.

Processing of bridge input traffic involves two parallel processing loops, as shown in FIG. 3A, one loop for processing packets received from the client interface 12 and the other for processing packets received from the communication network 10. If a data packet is received from the client interface 12, as determined in block 60, a determination is first made, in block 62, as to whether the packet is a loopback packet or an outbound packet. If the received packet is an outbound packet, it is stored in the outbound buffer, as indicated in block 64, and an entry is made in the last position of the from-client list, as indicated in block 66. For a loopback packet, processing is similar except that the packet is stored in the loopback buffer, as indicated in block 68, then entries are made in the last position of both the from-client list and the inbound list, as indicated in block 70. For congestion control purposes, a loopback packet is treated as both a from-client packet and as an inbound packet. After processing a packet received from the client interface 12, in blocks 64, 66, 68 and 70, the processing loop continues in block 60, which continually detects input packets from the client interface.

In a similar processing loop to process packets received from the communication network 16, block 72 determines whether a received packet is from the communication network. If so, the received packet is stored in the inbound buffer, as indicated in block 74, and an entry is made in the inbound list, as indicated in block 76. The processing loop continues in block 72.

Figure 3B:
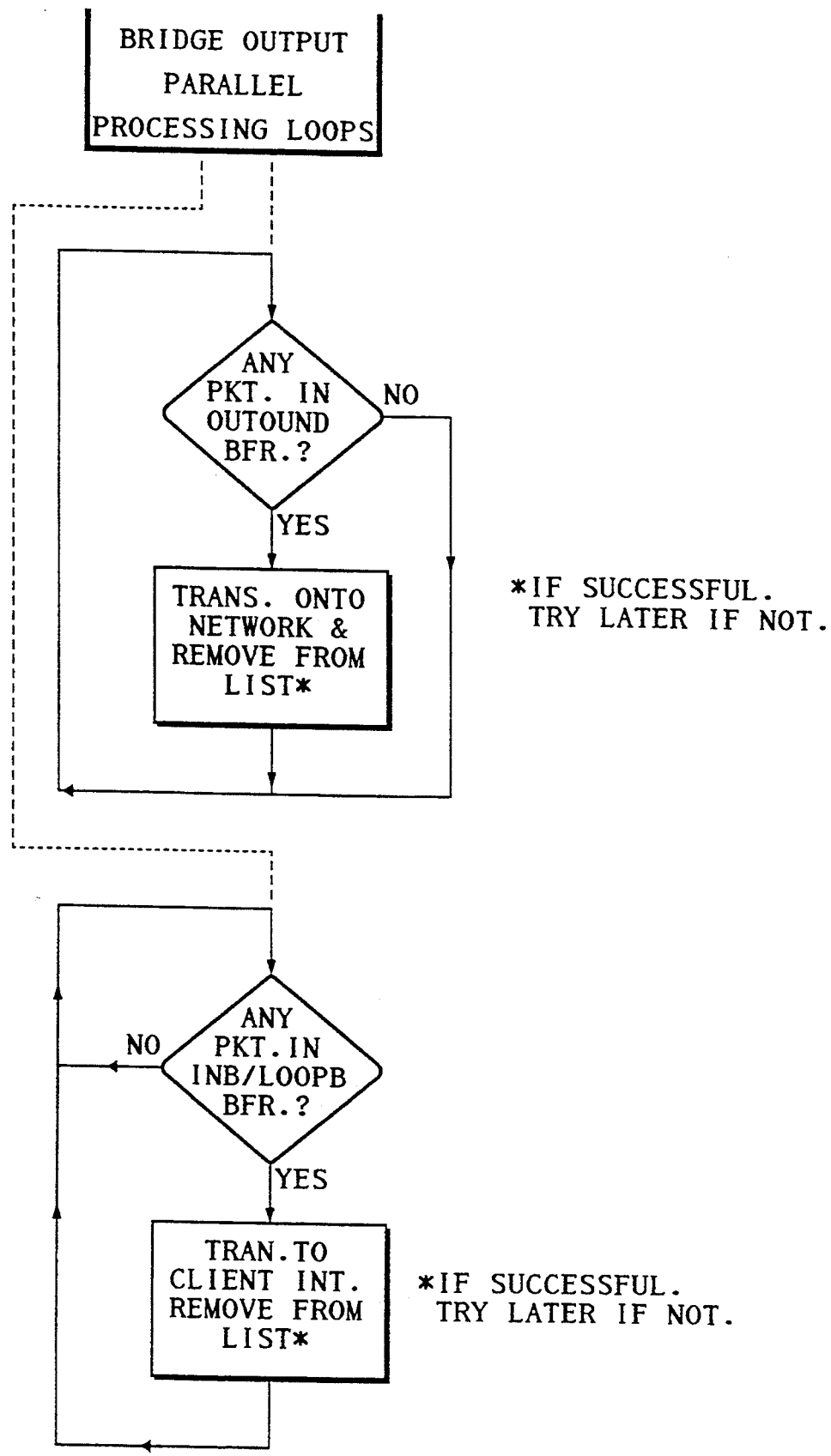
FIG. 3B is a flowchart showing the functional steps performed in processing packets that are to be output from the bridge.

Bridge output processing proceeds basically as shown in FIG. 3B, with two parallel processing loops, one to process packets to be output to the communication network 16 and the other to process packets to be output to the client interface 12. In processing output to the communication network, the device first determines, in block 80, whether there is a packet in the outbound buffer 20B. If so, the bridge attempts to transmit the data packet onto the communication network 16, as indicated in block 82. If the communication network also uses CSMA/CD protocols, the attempted transmission may not be successful, in which case no further attempt will be made for some selected random period of time. If the transmission is successful, the from-client list will be updated to remove an entry corresponding to the transmitted packet. The processing loop then continues checking for the presence of a packet in the outbound buffer 20B. The other output processing loop, shown at the bottom of FIG. 3B, includes checking to determine if any packet is waiting in the inbound or loopback buffers 20B and 20C, as indicated in block 84. If so, an attempt will be made to transmit the packet to the client interface 12, as indicated in block 86. Since the carrier interface uses CSMA/CD protocols, the attempt may not necessarily be successful. If it is successful, the lists are appropriately updated. For an inbound packet, the corresponding entry in the inbound list is removed. For a loopback packet, the corresponding entries in the inbound and from-client lists are removed. After these steps, the processing loop continues at block 84, which continually checks for the presence of packets in the inbound or loopback buffers 20B and 20C.

Figure 3C:
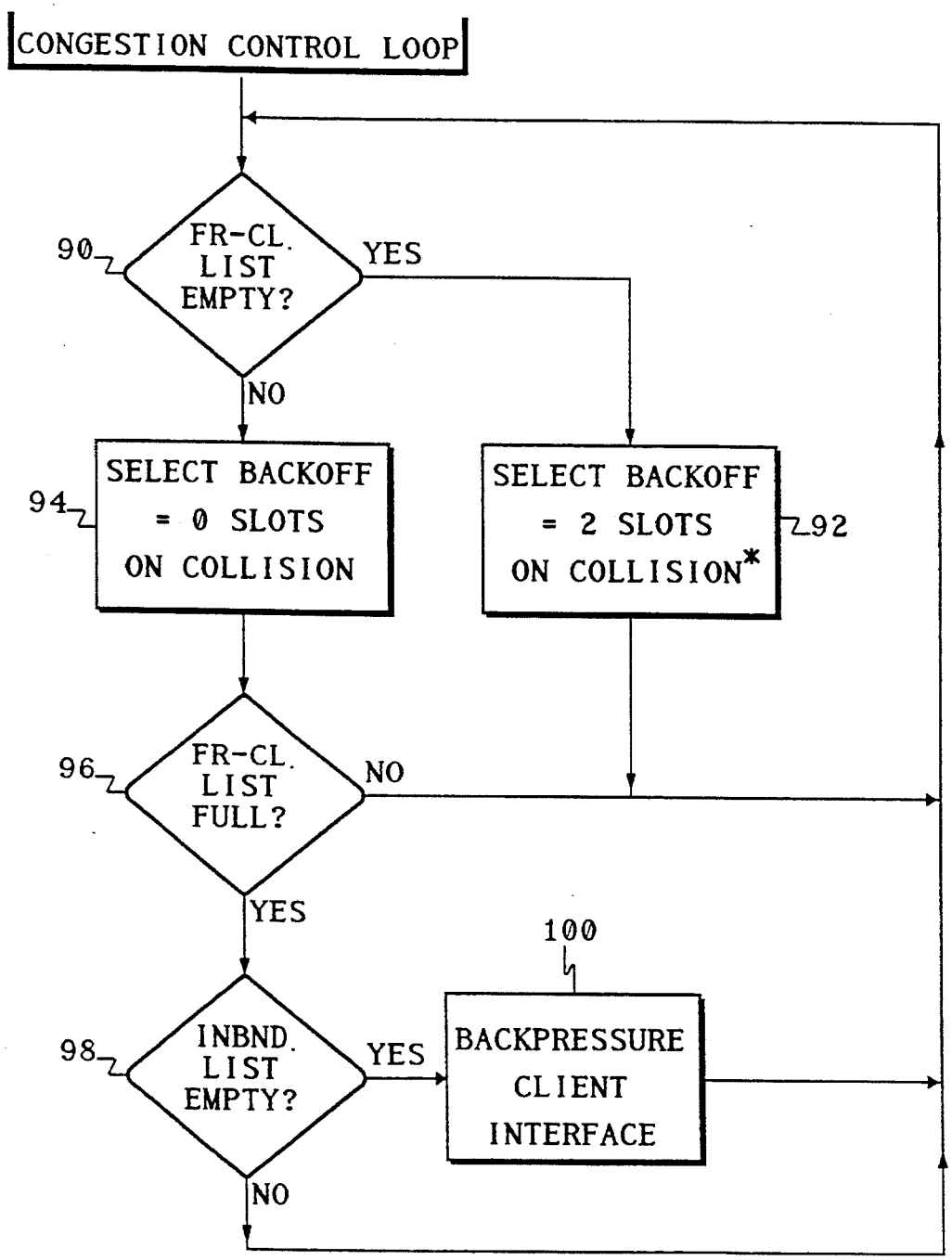
FIG. 3C is a flowchart showing the functional steps performed in controlling packet congestion in the bridge.

The functions performed in congestion control are depicted in FIG. 3C. It will be understood that the functions of congestion control, input processing and output processing are all performed in a practically simultaneous fashion, but are shown for convenience as separate functional loops in FIGS. 3A, 3B and 3C. The congestion control loop involves two tests of the status of the from-client and inbound lists. First, if the from-client list is empty, as determined in block 90, a backoff parameter of two slots is selected to be used in the event of a collision when transmitting to the client interface, as indicated in block 92. The backoff parameter value is typically measured in "slot times," a slot time being the network roundtrip delay in the maximum configuration of the network. The slot time may also be defined as the time to transmit 512 bits at a 10-megahertz serial data rate (=51.2 microseconds). Using a higher backoff value, i.e. a delay of two slot times instead of zero before trying to transmit again, ensures that a client connected to the client interface will be able to retransmit on the interface after the first collision. When the from-client list is empty, there are no outbound or loopback packets waiting to be forwarded or processed by the bridge. Therefore, if this condition is sensed following a collision with the client, the congestion control logic takes action to give priority to retransmission from the client onto the client interface, and from there to the bridge. Selecting a backoff value of 2 guarantees the client's transmission only following its first collision. A more general, and slightly more complex approach, to provide assurance of client transmission following any number of successive collisions, is described below.

If the from-client list is not empty, as determined in block 90, the backoff parameter value is set to zero, as indicated in block 94. This favors the bridge in any conflict for access to the client interface 12, since a zero backoff value will mean that the bridge will keep trying repeatedly for access, in the event of a collision. Because the from-client list is not empty, there is no point in giving priority to further transmission from the client to the bridge.

The second condition tested for by the congestion control logic involves two tests. If the from-client list has two entries in it, as determined in block 96, this indicates that the list is full. In the embodiment disclosed, the from-client list has room for a maximum of only two entries. If the from-client list is full by this test, it is next determined, in block 98, whether the inbound list is empty. If the from-client list is full and the inbound list is empty, this indicates that the bridge has two outbound packets stored in the outbound buffer for forwarding to the communication network 16, and that there are no inbound or loopback packets waiting to be sent to the client interface 12. In such a condition, further input from the client interface must be prevented. This is effected by applying "backpressure" to the client interface, as indicated in block 100. Applying backpressure means impressing a carrier signal on the interface. To other users of the interface, i.e. to clients, the interface appears to be busy and no data packets can be transmitted. Although not explicitly shown in FIG. 3C, it will be understood that, when the condition determined in blocks 96 and 98 no longer exists, the carrier backpressure will be removed and clients are again free to transmit onto the client interface 12.

If the from-client list is not full, as determined in block 96, there is no need to apply the backpressure because there is still room in the outbound buffer or the loopback buffer for at least one more packet from the client interface. If the from-client list is full but the inbound list is not empty, as determined in blocks 96 and 98, again there is no need to apply the backpressure because the inbound list indicates that there is at least one data packet to send to the client interface. Sending this data packet will render the client interface busy and inhibit any further data packets from being transmitted onto the interface. Further, because the from-client list is full, the back-off value will be set to zero (block 94), favoring the bridge in any conflict for the client interface.

Although multiple clients may be connected to the client interface 12, when backpressure is applied to the interface none of the clients will be able to communicate through the interface, even to each other. However, this situation is not worse than having the multiple clients connected directly to the communication network, because the fact that the outbound buffer is not empty indicates that the communication network is busy and, therefore, if the clients were connected directly to the communication network, they would also not be able to communicate with each other. In actuality the situation with the device of the invention in place is a little better, because if there is only one packet in the outbound buffer, the clients may still communicate with each other. They would not have been able to communicate if they were connected directly to the communication network.

In summary, the bridge operates as follows. Whenever a packet is received from the client, a field in the packet header is checked to determine if the packet is a loopback packet or an outbound packet. If an outbound packet, it is placed in the outbound buffer and an entry is added to the end of the from-client list. If a loopback packet, it is placed in the loopback buffer and an entry is added to the end of both the from-client list and the inbound list. Whenever a packet is received from the network, it is placed in the inbound buffer and at the end of the inbound list. The lists are updated in accordance with the following rules:

1. All packets received from either side are added to their appropriate lists at the beginning of the reception operation. This is to facilitate "cut-through" operation, in which a packet is passed straight through the device of the invention without delay.

2. All packets transmitted to either side are removed from the appropriate lists once the transmission has passed the "network acquisition time," i.e. after the transmission has progressed to a point beyond which retransmission will not be needed.

3. If an inbound packet and a loopback packet are both first detected during the same timing cycle of the device, the inbound packet will take precedence and will be added to the inbound list before the loopback packet. The opposite rule could have been adopted as an alternative.

4. Congestion control is effected by continuous monitoring of the lists, as follows:

If the from-client list contains zero entries, the backoff value in the event of a collision is set to 2 instead of a random value. The client device will select a value of 0 or 1, thereby ensuring that, on its first retransmission, the client will be able to transmit packets to the device of the invention. (Selecting a backoff value of 2 guarantees the client's transmission only following its first collision. A more general, and slightly more complex approach, to provide assurance of client transmission following any number of successive collisions, is described below.)

If the from-client list is not empty, i.e. it contains one or two entries, the backoff value following a collision is set to 0, to give priority to device retransmission upon a collision with a client.

If the from-client list contains two entries, i.e. it is full, and the inbound list is empty, carrier backpressure is applied to the client interface, to inhibit further transmission from the client interface.

As described above, when the from-client list is empty the bridge device backoff value is set to 2 to give priority to a client retransmission. However, the CSMA/CD protocols are such that the client will be sure of priority only on the first retransmission try. After a collision, the normal CSMA/CD protocol calls for the use of randomly selected backoff value between 0 and 1. If there is a second collision, the backoff value is selected from 0 through 3; and after a third collision the backoff value may be between 0 and 7. There is a possibility that a client will encounter more than one collision, perhaps because of a conflicting transmission from another client, and the backoff value will be set to some number greater than 2. The client may not then be able to transmit a packet onto the client interface, and there is a small possibility that the client will have to discard a data packet, after sixteen unsuccessful transmission attempts. This is not a serious problem because, for the next packet that the client tries to transmit, the backoff value will be set to 0 or 1 for retransmission, and the client will have priority. There may also be bridge packet loss, which occurs when the bridge buffers are full and it has no buffering available to receive an incoming packet.

It is useful to consider the various situations that could result in the from-client list being full, i.e. having two entries. Since from-client packets may be outbound packets or loopback packets, it might first be surmised that a full from-client list could have two packets of either type, or one of each type. As a practical matter, however, the number of such possible combinations is fewer than this, because the receipt of a loopback packet effectively inhibits the receipt of further packets from the client interface. If a first loopback packet is received, it will generate an entry in both the inbound list and the from-client list. Because the from-client list is not empty, the backoff value will be set to zero in the event of a collision, giving retransmission priority to the bridge device, to transmit the loopback packet back to the client interface. Therefore, a second packet, whether it is a loopback packet or an outbound packet, cannot be received until the first loopback packet has been processed. If the first packet received is an outbound packet, a second packet may be received from the client interface, thereby filling the from-client list. The second packet may be an outbound packet or a loopback packet. An important reason for allowing no more than one loopback packet at a time is to regulate the frequency of loopback packets and to ensure that the device has a chance to empty out its inbound buffer. If the client were permitted to send an uninterrupted chain of loopback packets, it could cause an unacceptable level of inbound packet loss.

An important aspect of the invention not yet described relates to the selection of a backoff value to give priority to the client, upon detection of an empty from-client list (block 90, FIG. 3C). As described thus far, the backoff value selected is 2 time slots (block 92, FIG. 3C). However, this value guarantees the client's transmission only following a first collision, since the client will select a value between 0 and 1 after a first collision. It will be recalled that the client will select a value in the range 0 through 3 after a second collision, then a value of 0 through 7 after a third collision, and so forth. Therefore, in a situation involving two or more successive collisions, the client may select a backoff value of 2 or more, and will not attain priority over the device of the invention. This may result in an unacceptable level of packet loss.

In accordance with this aspect of the invention, the backoff value selected in the bridge device of the invention is always at least one greater than the backoff value selected by the client. Specifically, the bridge maintains a count of the number, n, of consecutive collisions that have occurred for access to the client interface. When a packet is received from the client interface, the count, n, is cleared; and is subsequently incremented for each detected collision between the bridge and the client. When the bridge decides to give priority to the client, by detection of an empty from-client list, the backoff value selected is computed from the nth power of 2, where n is the number of consecutive collisions. Thus, after one collision the backoff value is 2, after two consecutive collisions it is 4, after three consecutive collisions it is 8, and so forth. The backoff value is, therefore, one greater than the highest possible value that can be selected by the client.

In order to avoid unacceptable packet loss in the inbound buffer, because the device of the invention is waiting much longer before sending inbound packets to the client, n will typically have some upper limit which will be determined by the acceptable packet loss. The presently preferred approach is to choose the upper limit of n dynamically, as a function of the available remaining space in the inbound buffer. Alternatively, since packet loss is calculated statistically, it is possible to choose the number of slots to backoff to be a fraction of $2^n$, for example $2^{n-1}+1$. Statistically, the random backoff number chosen by the client will be between 0 and $2^{n-1}$ half the time, so the selection of a backoff value of $2^{n-1}+1$ will ensure priority for the client half the time.

It will be appreciated from the foregoing that the present invention represents a significant advance in the field of bridge devices for forwarding data packets from one network to another. In particular, the invention provides for a minimally sized buffer memory for storage of data packets from a selected network to which the bridge is connected. By limiting the amount of buffer memory provided for storing data packets received from the selected network, the invention provides for a low cost implementation, maintaining an acceptable level of packet loss. Moreover, the invention achieves this goal without significant degradation in performance, as compared with connecting client devices directly to the communication network. The device of the invention provides a slight improvement in data throughput, since the client interface allows for communication between multiple clients even when the from-client list is not empty. A single entry in the from-client list indicates that the communication network is not able to accept a packet, but there is still the possibility of transmission from one client to another over the client interface. Obviously, the presence of the device of the invention interposes some additional latency, but this is small enough (30-40 bytes) to be considered negligible.

The device of the invention controls packet congestion in the bridge by modifying the backoff value used in the event of a conflict for transmission onto the selected network, and by applying backpressure to render the selected network apparently busy when conditions do not favor the receipt of any further data packets in the bridge. It will also be appreciated that, although an embodiment of the invention has been described in detail for purposes of illustration, various modifications may be made without departing from the spirit and scope of the invention. Accordingly, the invention is not to be limited except as by the appended claims.

We claim:

1. A method for controlling the flow of data packets that are either outbound from a half-duplex client interface using a Carrier Sense Multiple Access with Collision Detection (CSMA/CD) protocol, to a communication network, or inbound from the communication network to the client interface, in such a manner as to minimize buffer memory requirements, the method comprising the steps of:

receiving inbound data packets from a communication network;

storing each inbound data packet, if necessary, until the client interface becomes available;

transmitting the packet onto the client interface;

receiving outbound data packets from the client interface;

storing each outbound data packet, if necessary, until the communication network becomes available;

transmitting the outbound data packet onto the communication network; and controlling the steps of transmitting to and receiving from the client interface, to minimize buffering requirements; wherein the step of controlling transmitting to and receiving from the client interface includes selecting a time interval to wait before retransmitting in the event of a conflict for access to the client interface, the time interval being selected based on the numbers of inbound and outbound data packets stored for later processing.

2. A method as defined in claim 1, and further comprising the steps of:

receiving a loopback packet from the client interface;

storing the loopback packet in loopback buffer, if necessary, for later transmission back to the client interface.

3. A method for controlling the flow of data packets that are either outbound from a half-duplex client interface using a Carrier Sense Multiple Access with Collision Detection (CSMA/CD) protocol, to a communication network, or inbound from the communication network to the client interface, in such a manner as to minimize buffer memory requirements, the method comprising the steps of:

receiving inbound data packets from a communication network;

storing each inbound data packet, if necessary, until the client interface becomes available;

transmitting the packet onto the client interface;

receiving outbound data packets from the client interface;

storing each outbound data packet, if necessary, until the communication network becomes available;

transmitting the outbound data packet onto the communication network; and controlling the steps of transmitting to and receiving from the client interface, to minimize buffering requirements;

wherein the step of controlling transmitting to and receiving from the client interface includes maintaining a list of packets received from the client interface and not yet forwarded, maintaining a list of inbound packets received from the communication network and not yet forwarded to the client interface, and based on the status of the two lists of packets, making appropriate adjustments to client interface protocols to control the flow of data packets through the client interface;

and wherein the step of making appropriate adjustments to the client interface protocols includes detecting when the list of packets received from the client interface is empty and adjusting client interface protocol parameters to favor yielding client interface access to a client in the event of a conflict for access to the client interface, thereby guaranteeing successful retransmission of more packets from the client onto the client interface, and detecting when the list of packets received from the client interface is not empty and adjusting client interface protocol parameters to favor retaining client interface access in the event of a conflict for access, thereby giving priority to continued transmission of packets from the inbound buffer memory to the client interface.

4. A method as defined in claim 3, wherein the step of making appropriate adjustments to the client interface protocols further includes:

detecting when the list of packets received from the client interface is full and the list of inbound packets is empty, and placing the client interface in a busy condition so that the client device cannot transmit further data packets onto the client interface.

5. A method as defined in claim 3, wherein:

the step of adjusting client interface protocol parameters to favor yielding access to a client device includes selecting a larger time interval to wait before retransmitting after a conflict for the interface; and the step of adjusting client interface protocol parameters to favor retaining access to the client interface includes selecting a zero time interval to wait before retransmitting after a conflict for the interface.

6. A method as defined in claim 4, wherein:

the step of placing the client interface in a busy condition includes applying a carrier signal to the client interface.

7. Apparatus for processing of data outbound from a half-duplex client interface using a Carrier Sense Multiple Access with Collision Detection (CSMA/CD) protocol, to a communication network, and inbound from the communication network to the client interface, while minimizing buffer memory requirements, the apparatus comprising:

means for receiving inbound data packets from a communication network;

an inbound buffer memory, for storing each inbound data packet until the client interface is available;

means for transmitting the inbound data packet onto the client interface;

means for receiving outbound data packets from the client interface;

an outbound buffer memory, for storing each outbound data packet until the communication network is available;

means for transmitting a data packet from the outbound buffer memory onto the communication network; and means for controlling the means for transmitting to and receiving from the client interface, to minimize buffering requirements; wherein the means for controlling transmitting to and receiving from the client interface includes means for selecting a time interval to wait before retransmitting in the event of a conflict for access to the client interface, the time interval being selected based on the numbers of inbound and outbound data packets stored for later processing.

8. Apparatus for processing of data outbound from a half-duplex client interface using a Carrier Sense Multiple Access with Collision Detection (CSMA/CD) protocol, to a communication network, and inbound from the communication network to the client interface, while minimizing buffer memory requirements, the apparatus comprising:

means for receiving inbound data packets from a communication network;

an inbound buffer memory, for storing each inbound data packet until the client interface is available;

means for transmitting the inbound data packet onto the client interface;

means for receiving outbound data packets from the client interface;

an outbound buffer memory, for storing each outbound data packet until the communication network is available;

means for transmitting a data packet from the outbound buffer memory onto the communication network; and means for controlling the means for transmitting to and receiving from the client interface, to minimize buffering requirements;

wherein the means for controlling the means for transmitting to and receiving from the client interface includes means for maintaining a list of packets received from the client interface and not yet forwarded, means for maintaining a list of inbound packets received from the communication network and not yet forwarded to the client interface, and means operable in response to the status of the two lists of packets, for making appropriate adjustments to client interface protocols to control the flow of further data packets onto the client interface;

and wherein the means for making appropriate adjustments to the client interface protocols includes means operable only when the list of packets received from the client interface is empty, for adjusting client interface protocol parameters to favor yielding client interface access to a client in the event of a conflict for access to the client interface, thereby guaranteeing successful retransmission of a packet from the client onto the client interface, and means operable only when the list of packets received from the client interface is not empty, for adjusting client interface protocol parameters to favor retaining client interface access in the event of a conflict for access, thereby giving priority to continued transmission of packets from the inbound buffer memory to the client interface.

9. Apparatus as defined in claim 8, wherein the means for making appropriate adjustments to the client interface protocols further includes:

means operable only when the list of packets received from the client interface is full and the list of inbound packets is empty, for forcing the client interface into a busy condition so that the client device cannot transmit further data packets onto the client interface.

10. Apparatus as defined in claim 8, wherein:

the means for adjusting client interface protocol parameters to favor yielding access to a client device includes means for selecting a larger time interval to wait before retransmitting after a conflict for the interface; and the means for adjusting client interface protocol parameters to favor retaining access to the client interface includes means for selecting a zero time interval to wait before retransmitting after a conflict for the interface.

11. Apparatus as defined in claim 9, wherein:

the means for placing the client interface in a busy condition includes means for applying a carrier signal to the client interface.

12. A method for controlling the flow of data packets that are either outbound from a half-duplex first network using a Carrier Sense Multiple Access with Collision Detection (CSMA/CD) protocol, to a second network, and inbound from the second network to the first network, in such a manner as to minimize buffer memory requirements, the method comprising the steps of:

receiving inbound data packets from the second network;

storing each inbound data packet, if necessary, until the first network becomes available;

transmitting the packet onto the first network;

receiving outbound data packets from the first network;

storing each outbound data packet, if necessary, until the second network becomes available;

transmitting the outbound data packet onto the second network; and controlling the steps of transmitting to and receiving from the first network, to minimize buffering requirements; wherein the step of controlling transmitting to and receiving from the first network includes selecting a time interval to wait before retransmitting in the event of a conflict for access to the first network, the time interval being selected based on the numbers of inbound and outbound data packets stored for later processing.

13. A method for controlling the flow of data packets that are either outbound from a half-duplex first network using a Carrier Sense Multiple Access with Collision Detection (CSMA/CD) protocol, to a second network, and inbound from the second network to the first network, in such a manner as to minimize buffer memory requirements, the method comprising the steps of:

receiving inbound data packets from the second network;

storing each inbound data packet, if necessary, until the first network becomes available;

transmitting the packet onto the first network;

receiving outbound data packets from the first network;

storing each outbound data packet, if necessary, until the second network becomes available;

transmitting the outbound data packet onto the second network; and controlling the steps of transmitting to and receiving from the first network, to minimize buffering requirements;

wherein the step of controlling transmitting to and receiving from the first network includes maintaining a list of packets received from the first network and not yet forwarded, maintaining a list of inbound packets received from the second network and not yet forwarded to the first network, and based on the status of the two lists of packets, making appropriate adjustments to network protocols of the first network to control the flow of data packets through the first network;

and wherein the step of making appropriate adjustments to the network protocols of the first network includes detecting when the list of packets received from the first network is empty and adjusting first network protocol parameters to favor yielding first network access to another device in the event of a conflict for access to the first network, thereby guaranteeing successful retransmission of a packet from the other device onto the first networks, and detecting when the list of packets received from the first network is not empty and adjusting first network protocol parameters to favor retaining first network access in the event of a conflict for access, thereby giving priority to continued transmission of packets from the inbound buffer memory to the first network.

14. A method as defined in claim 13, wherein the step of making appropriate adjustments to the network protocols of the first network further includes:

detecting when the list of packets received from the first network is full and the list of inbound packets is empty, and placing the first network in a busy condition so that the other device cannot transmit further data packets onto the first network.

15. A method as defined in claim 13, wherein:

the step of adjusting first network protocol parameters to favor yielding access to another device includes selecting a larger time interval to wait before retransmitting after a conflict for the interface; and the step of adjusting first network protocol parameters to favor retaining access to the first network includes selecting a zero time interval to wait before retransmitting after a conflict for the interface.

16. A method as defined in claim 14, wherein:

the step of placing the first network in a busy condition includes applying a carrier signal to the first network.

* * * * *